Feb. 20, 1968     W. J. HALEY     3,369,430

TRANSMISSION CONTROLS

Filed Dec. 20, 1965     7 Sheets-Sheet 1

Inventor:
William J. Haley
By: Robert L. Zieg Atty.

PRESSURE CHANGE IN CONDUIT 146 DURING 2-3 SHIFT.

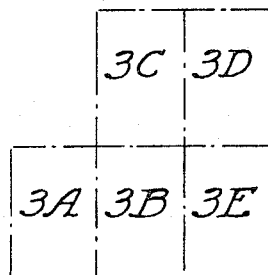
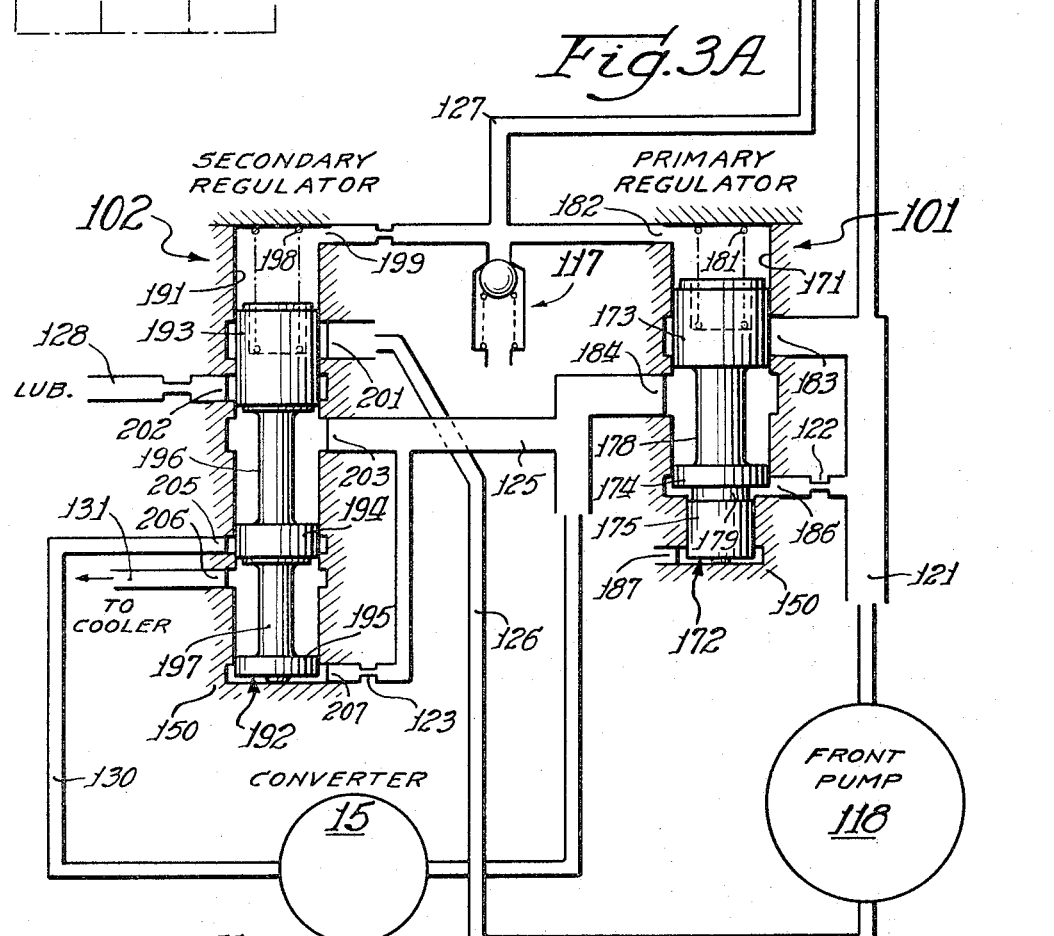
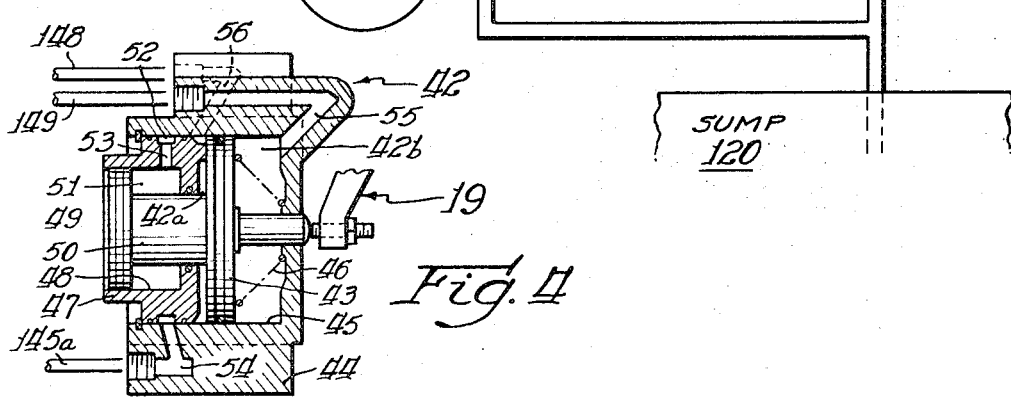

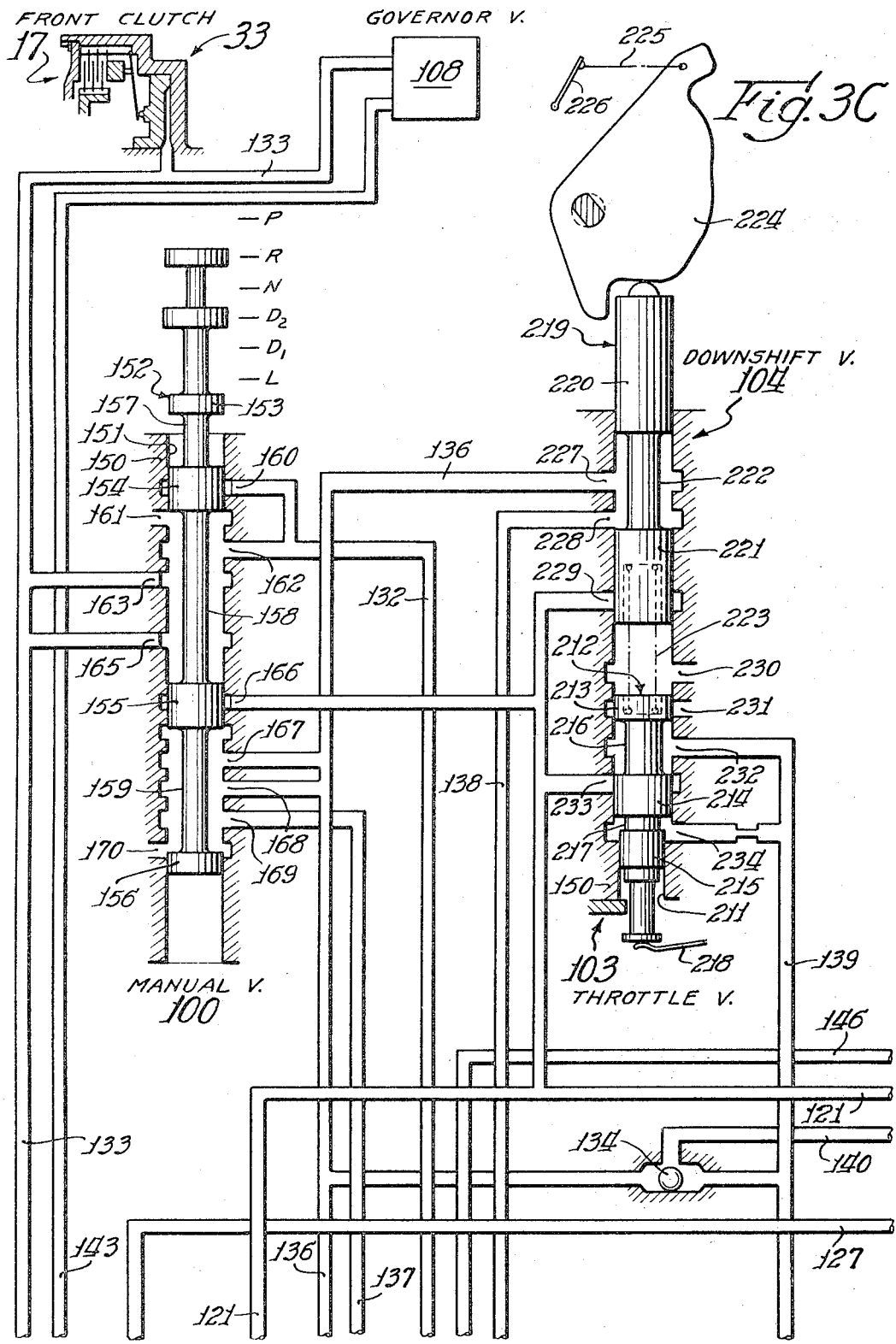

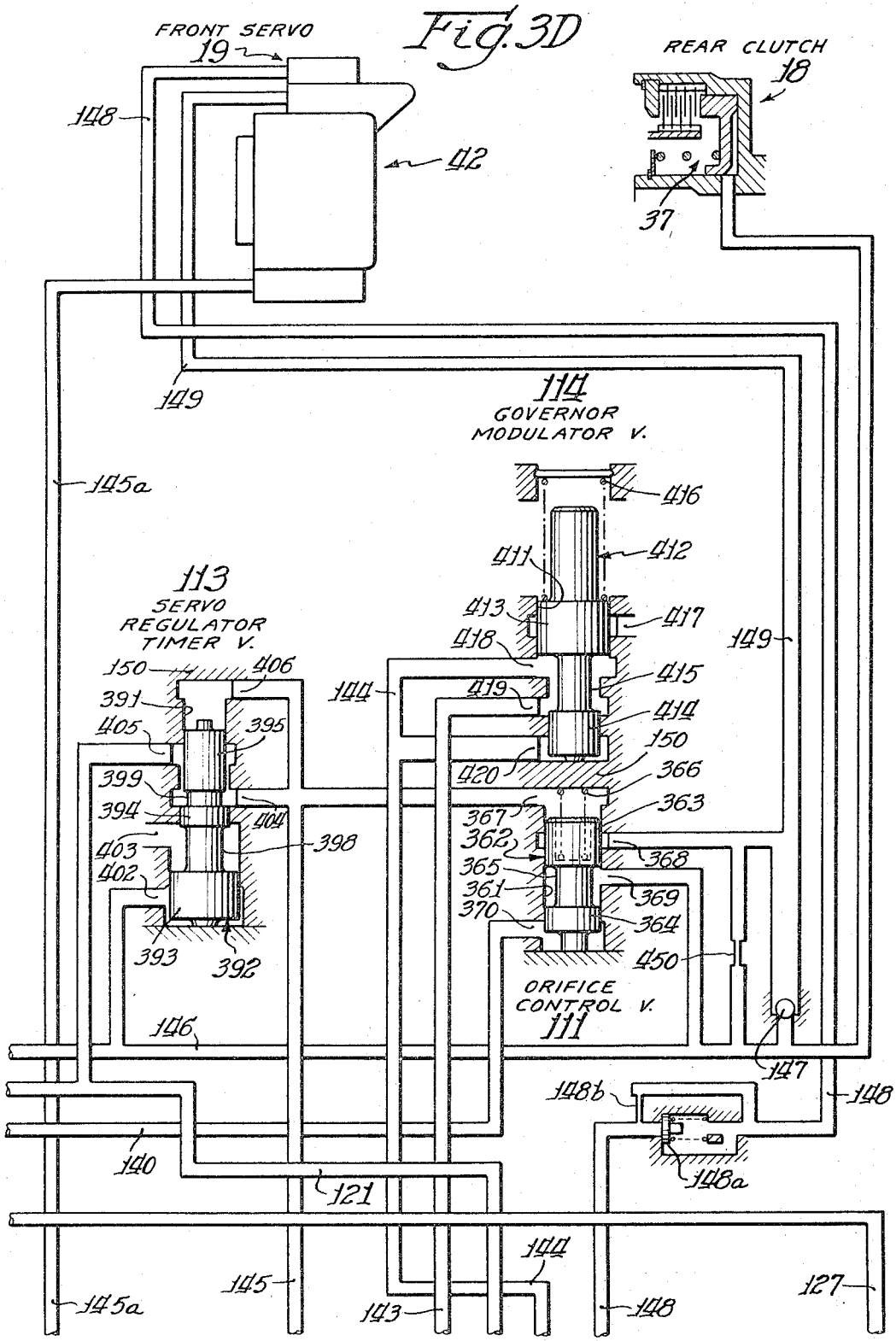

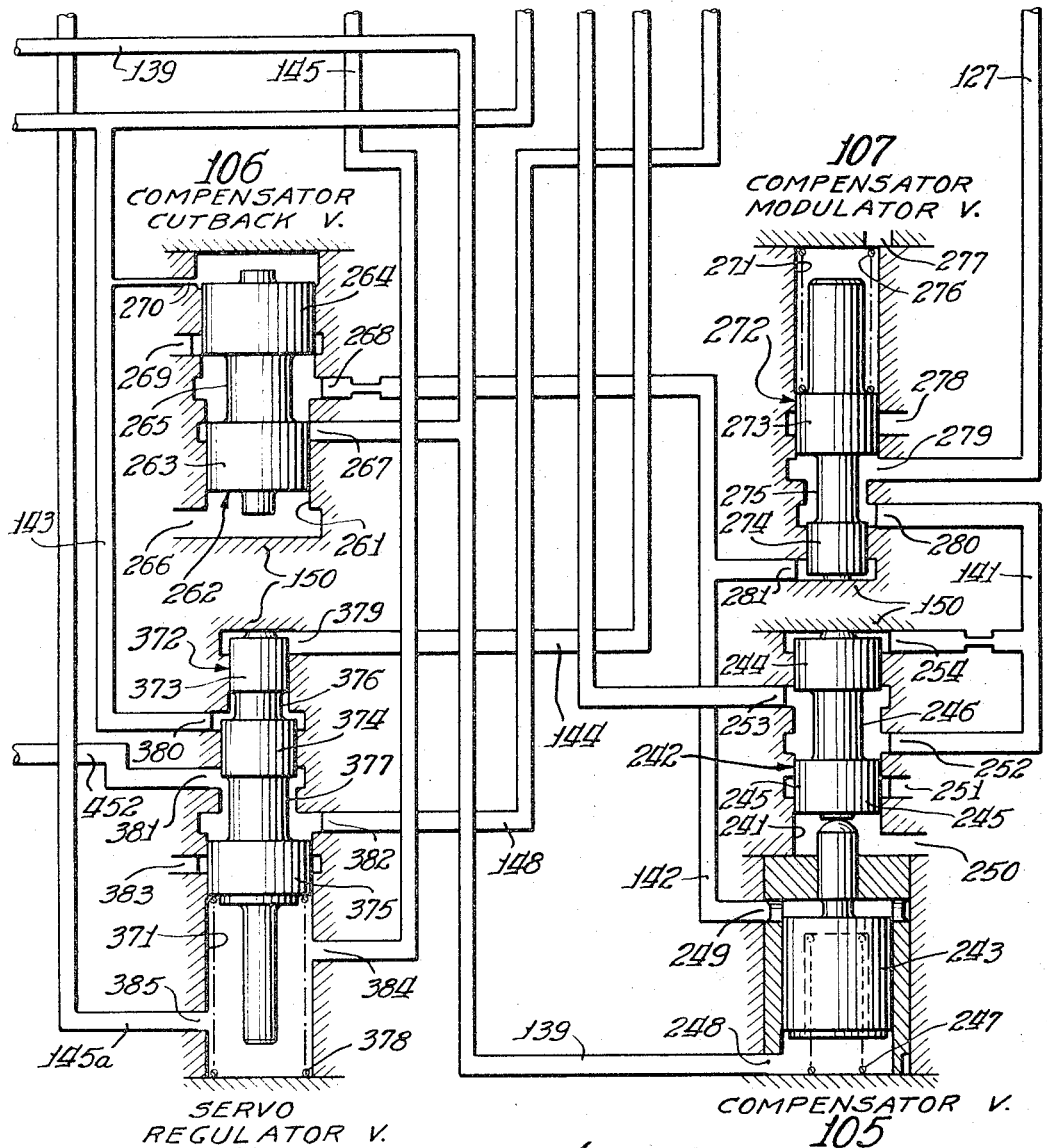
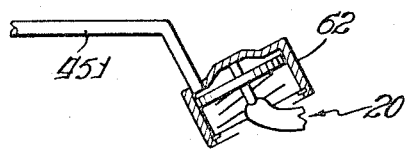
Fig. 3E

United States Patent Office 3,369,430
Patented Feb. 20, 1968

3,369,430
TRANSMISSION CONTROLS
William J. Haley, Muncie, Ind., assignor to Borg-Warner Corporation, Chicago, Ill., a corporation of Illinois
Filed Dec. 20, 1965, Ser. No. 514,782
5 Claims. (Cl. 74—752)

This invention relates to an automatic transmission control system for use in automotive vehicles. It is an object of the present invention to provide an improved transmission control system giving desirable shift qualities under all driving conditions.

More particularly, it is the object of this invention to provide a transmission control system utilizing a pressure regulating system which will provide an operating pressure for the friction elements of the transmission which will increase with throttle depression and decrease with increasing vehicle speed and to provide a regulating valve which will be rendered effective when the high speed drive ratio is engaged which can delay the engagement of a servomotor to establish a second speed to thereby produce a smooth 3–2 downshift.

The invention consists of the novel constructions, arrangements and devices to be hereinafter described and claimed for carrying out the above objects and such other objects as will appear from the following description of a preferred form of the invention illustrated with reference to the accompanying drawings wherein:

FIGURE 4 is a cross-sectional view of the servomotor for the front brake of the transmission.

Figure 2:
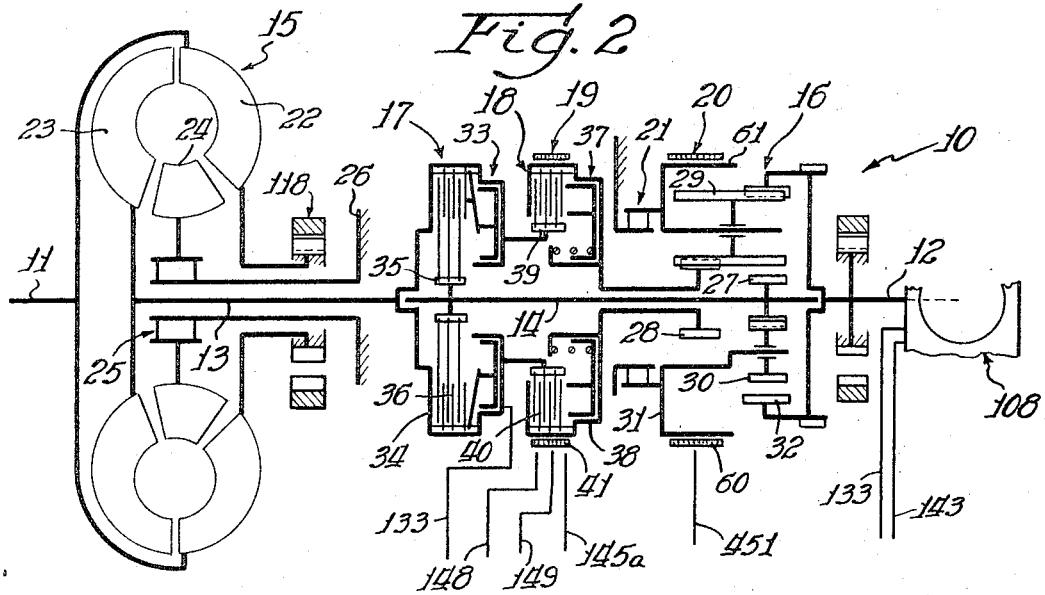
FIGURE 2 is a schematic cross-sectional view of the transmission of the present invention.

Referring to FIGURE 2 the transmission mechanism is designated generally by numeral 10 and comprises an input shaft 11 and an output shaft 12, a first intermediate shaft 13, and a second intermediate shaft 14 all coaxially aligned. In addition, the transmission 10 comprises a fluid torque converter 15, a planetary gear set 16, a front clutch 17, a rear clutch 18, a front brake 19, a rear brake 20 and a one-way brake 21.

The torque converter 15 comprises a driving element or impeller 22, a driven element or turbine 23 and a reaction element or stator 24. The impeller 22 is connected to be driven by the drive shaft 11, the turbine 23 is connected to the first intermediate shaft 13, and the stator 24 is connected through a one-way brake 25 to a transmission casing 26.

A planetary gear set comprises a first sun gear 27, a second sun gear 28, a plurality of long planet gears 29, a plurality of short planet gears 30, a planet gear carrier 31 and a ring gear 32. The short planet gears 30 are enmeshed with the sun gear 27 and with the long planet gears 29 and the long planet gears 29 are enmeshed with the sun gear 28 and the ring gear 32. The sun gear 27 is connected with the second intermediate shaft 14 and the ring gear 32 is connected to the output shaft 12. The front clutch 17 comprises a fluid under pressure in servomotor 33 for engaging the clutch and outer shell 34, an inner hub 35, and a plurality of inner-leaved friction discs 36. The outer shell 34 is connected to the first intermediate shaft 13 and the inner hub 35 is connected to the second intermediate shaft 14.

The rear clutch comprises a fluid pressure actuated servomotor 37 for engaging the clutch, an outer shell 38, an inner hub 39, and a plurality of inner-leaved discs 40. The inner hub 39 is connected to the outer shell 38 of the clutch 17 and the outer shell 38 is connected to a second sun gear 28 of the planetary gear set 16.

The front brake 19 comprises a friction band 41 adapted to engage the outer shell 38 of the rear clutch 18 for holding the sun gear 28 and a fluid pressure actuated servomotor 42 (FIGURE 4) for applying the brake 19.

Referring to FIGURE 4, the servomotor 42 is divided into an apply cavity 42a and a disapply cavity 42b, the two cavities being separated by a movable piston 43 which acts on the brake band 41. The servomotor 42 includes a body 44 having a bore 45 therein which piston 43 is slidable. A spring 46 is mounted in cavity 42b in engagement with piston 43 and body 44, thereby urging piston 43 to the left to the band release position. A fixed end plug 47 encloses the end of bore 45. A bore 48 is provided in end plug 47. A secondary piston 49 is slidable in bore 48 and is attached by means of a land 50 to move with piston 43. A secondary release cavity 51 is formed by piston 49, land 50, and end plug 47.

The end plug 47 has a circumferential groove 52. A passage 53 interconnects groove 52 and cavity 51. The body 44 includes a fluid passage 54 connected to groove 52, a fluid passage 55 in communication with cavity 42b, and a fluid passage 56 in communication with cavity 42a. Each of fluid passages 54, 55 and 56 are externally connected to particular fluid passages with the control circuit for transmission 10 as will be later described.

The rear brake 20 comprises a friction band 60 adapted to engage a brake drum 61 and a fluid pressure servomotor 62 (FIGURE 3E) for applying the brake band 60. The drum 61 is connected to the planetary carrier 31 and is effective when the brake 20 is engaged to hold the carrier 31 for certain driving gear ratios to be described hereinafter. The one-way brake 21 is connected between the planetary gear carrier 31 and the transmission casing 26 and is effective to hold the carrier 31 for normal low speed starts.

*Mechanical operation*

The transmission mechanism 10 provides three forward drive gear ratios and the reverse drive and also has a neutral condition. Neutral condition is obtained when all of the brakes and clutches are disengaged.

Low speed forward drive is obtained by engagement of the clutch 17 and of the one-way brake 21. In this condition, driving torque from a driving engine (not illustrated) is transmitted from the drive shaft 11 through the torque converter 15, the first intermediate shaft 13, engaged clutch 17, a second intermediate shaft 14 to the sun gear 27. A one-way brake 21 holds the planet gear carrier 31 so that it serves as a reaction element for the gear set 16 and the ring gear 32 is driven by the planet gears 29 and 30 for driving the output shaft 12.

A subsequent upshift to second or intermediate speed forward drive is obtained by engagement of the front brake 19. Torque is transmitted to the first sun gear 27 through the clutch 17 as previously described and the engaged brake 19 is effective to hold the sun gear 28 stationary so that it serves as a reaction element for the gear set 16. A one-way brake 21 overruns in this condition and the ring gear 32 is driven by the planet gears 29 and 30 for driving the output shaft 12 at an intermediate speed drive ratio.

A subsequent upshift to higher direct forward drive is obtained by disengagement of the brake 19 and engagement of the rear clutch 18. In this condition, driving torque is supplied to the first sun gear 27 as previously described and in addition is applied to the engaged clutch 18 to the second sun gear 28. The engaged clutches 17 and 18 effectively lock together the two sun gears 27 and 28 so that the gear set 16 rotates as a unit and a 1-1 or direct drive ratio is obtained through the transmission.

Reverse drive is obtained by disengagement of the clutch 17 and engagement of the rear clutch 18 and rear brake 20. In this condition driving torque from the engine is transmitted through the torque converter 15, the intermediate shaft 13, the outer shell 34 of the clutch 17 and through the engaged clutch 18 to the sun gear 28. The brake 20 is effective to hold the planet gear carrier 31 stationary to serve as a reaction element for the gear set 16. Forward driving torque supplied through the sun gear 28 is transmitted through the long planet gears 29 for driving the ring gear 32 and the output shaft 12 in the reverse direction.

A manual low speed forward drive condition is obtainable by engagement of the front clutch 17 and rear brake 20. The rear clutch 18 and front brake 19 are disengaged. In this condition the rear brake 20 functions to hold the planet gear carrier 31 stationary so that it serves as a reaction element for the gear set 16. Low speed forward drive condition is then obtained in the same manner as when the one-way brake 21 is engaged to hold the carrier 31 stationary except that upshifts to higher speed ratios are not obtainable unless the manual selector lever is moved to a drive position as will be described later.

Figure 1:
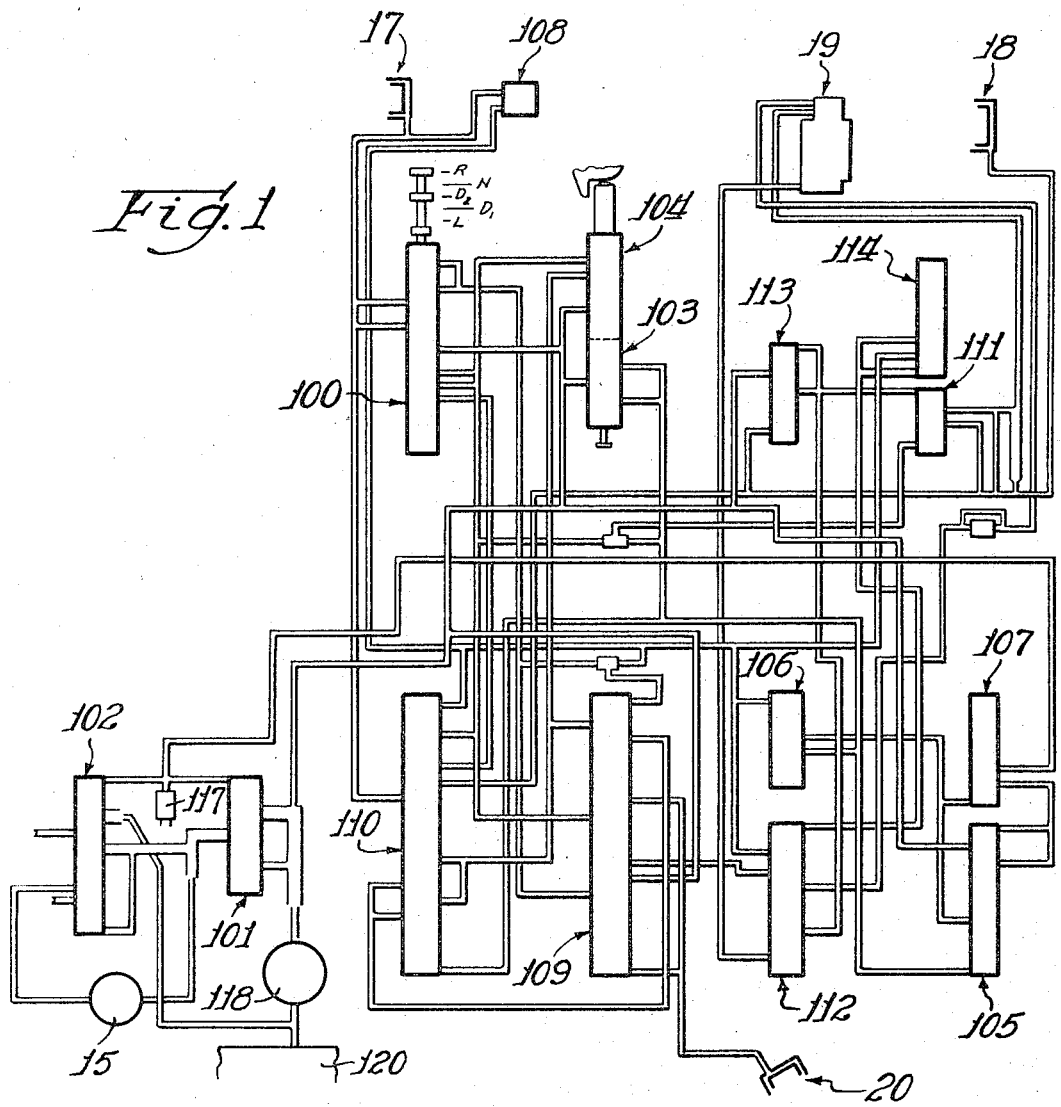
FIGURE 1 is an over-all schematic view of the hydraulic control system of the present invention.

The hydraulic control system for the transmission of FIGURE 2 is shown schematically in FIGURE 1 and is shown in detail in FIGURES 3A, 3B, 3C, 3D and 3E.

The hydraulic control system for the transmission includes the following valves:

Manual control valve 100;
Primary regulator valve 101;
Secondary regulator valve 102;
Throttle valve 103;
Downshift valve 104;
Compensator valve 105;
Compensator cut-back valve 106;
Compensator modulator 107;
Governor valve 108;
1-2 shift valve 109;
2-3 shift valve 110;
Orifice control valve 111;
Servo regulator valve 112;
Servo regulator timer valve 113;
Governor modulator valve 114; and
Safety valve 117.

The transmission includes a pump 118 connected to be driven by the input shaft 11. The pump 118 draws fluid from the sump 120.

The manual selector valve 100 has a case portion 150 with a bore 151 therein. A piston 152 is slidable within the bore 151 and has lands 153, 154, 155 and 156 thereon. The valve piston includes grooves 157, 158 and 159. The valve is also provided with ports 160, 161, 162, 163, 165, 166, 167, 168, 169 and 170.

The primary regulator valve 101 includes a bore 171 provided in the case assembly 150 and also comprises the piston 172 slidable in the bore provided with lands 173, 174 and 175. The valve piston is also provided with grooves 178 and 179. A spring 181 urges the piston 172 down as illustrated in FIGURE 2. The primary regulator valve is also provided with ports 182, 183, 184, 186 and 187.

The secondary regulator valve 102 comprises a bore 191 provided in the case assembly 150 and has a piston 192 slidable within the bore. The piston 192 is provided with lands 193, 194 and 195. The piston is also provided with grooves 196 and 197. A spring 198 urges the secondary regulator valve down as illustrated in FIGURE 3A. The secondary regulator valve is further provided with ports 199, 201, 202, 203, 205, 206 and 207.

The throttle valve 103 comprises a bore 211 provided in the case assembly 150 and includes a piston 212 slidable within the bore. The piston 212 is provided with lands 213, 214, 215. The piston is also provided with grooves 216 and 217. A blade type spring 218 urges the throttle valve piston up as viewed in FIGURE 3C.

The downshift valve 104 includes a piston 219 slidable in the bore 211 provided in the case assembly 150 and is provided with lands 220 and 221 separated by groove 222. A spring 223 is mounted in engagement with the piston 219 of the downshift valve 104 and the piston 212 of the throttle valve 103 and urges the valves apart. A cam 224 is provided which engages the upper end of the downshift valve piston 219. The cam 224 is connected to the throttle pedal 226 by linkage 225.

The bore 211 is provided with ports 227, 228, 229, 230, 231, 232, 233 and 234 for the downshift and throttle valves.

The compensator valve 105 includes a bore 241 in the case assembly 150 and has a piston 242 slidable in the bore and a plug 243 also mounted in the bore. The piston 241 is provided with lands 244 and 245 separated by a groove 246. The plug 243 is urged up as illustrated in FIGURE 3E by spring 247. The compensator valve 105 is provided with ports 248, 249, 250, 251, 252, 253 and 254. The compensator cutback valve 106 comprises a bore 261 provided in the case assembly 150 and has a piston 262 slidable therein. The piston 262 includes lands 263 and 264 separated by groove 265. The compensator valve is provided with ports 266, 267, 268, 269 and 270.

The compensator modulator valve 107 comprises a bore 271 provided in the case assembly 150 and has a piston 272 slidable within the bore. The piston 272 is provided with lands 273 and 274, separated by a groove 275. A spring 276 urges the piston 272 down as illustrated in FIGURE 3E. The compensator modulator valve is provided with ports 277, 278, 279, 280 and 281.

Figure 3B:
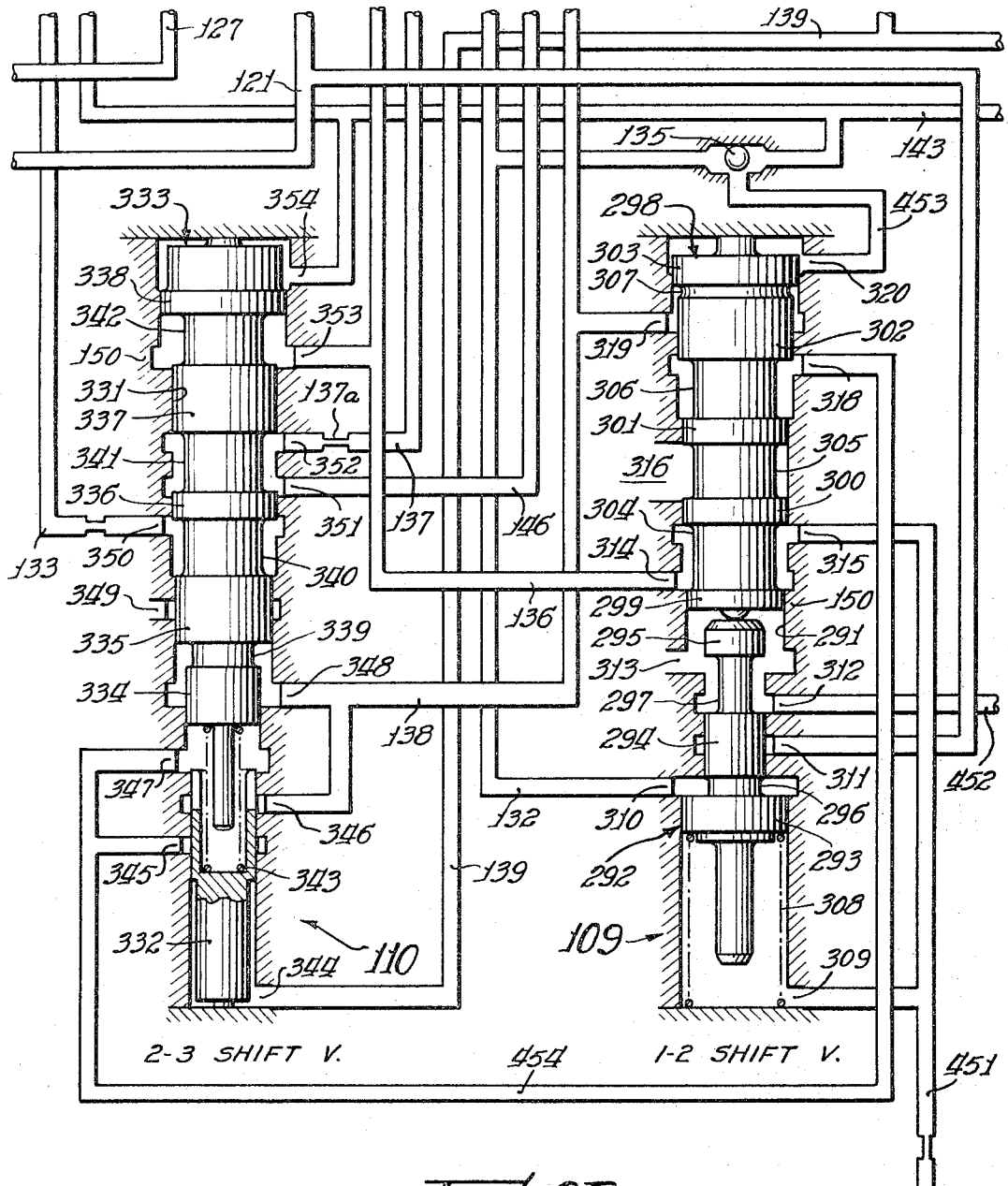
FIGURE 3 is a layout diagram of FIGURES 3A, 3B, 3C, 3D and 3E which discloses the control system in greater detail.

The 1-2 shift valve 109 comprises a bore 291 in the case portion 150 and has a piston 292 slidable in the bore 291. The piston 292 includes lands 293, 294 and 295. The piston also has grooves 296 and 297. Also slidable within the bore 291 is a piston 298 which has lands 299, 300, 301, 302 and 303 thereon. The piston also has grooves 304, 305, 306 and 307. A spring 308 is provided which urges the piston 292 to its upper position as illustrated in FIGURE 3B. The 1-2 shift valve is provided with ports 309, 310, 311, 312, 313, 314, 315, 316, 318, 319 and 320.

The 2-3 shift valve 110 includes a bore 331 in the case portion 150 and has a plug 332 within the bore and also a piston 333 mounted within the bore. The piston 333 has lands 334, 335, 336, 337 and 338 thereon. The piston also has grooves 339, 340, 341 and 342 thereon. A spring 343 is mounted between the piston 333 and the plug 332 and urges the piston and plug apart. The 2-3 shift valve 110 has ports 344, 345, 346, 347, 348, 349, 350, 351, 352, 353 and 354.

The orifice control valve 111 includes a bore 361 in the case portion 150 and has a piston 362 slidable in the bore. The piston 362 has lands 363 and 364 separated by a groove 365. A spring 366 is mounted between the piston 362 and the case and urges the piston down as illustrated in FIGURE 3D. The orifice control valve 11 has ports 367, 368, 369 and 370.

The servo regulator valve 112 has a bore 371 in the case assembly 150 and includes a piston 372 slidable in the bore which has lands 373, 374, and 375 thereon. The piston 372 is also provided with grooves 376 and 377. A spring 378 urges the piston 372 to the up position as illustrated in FIGURE 3E. The front servo apply regulator valve 112 also has ports 379, 380, 381, 382, 383, 384 and 385.

The servo regulator timer valve 113 includes a bore 391 in the case assembly 150 and has a piston 392 slidable in the bore. The piston 392 is provided with lands 393, 394 and 395. The piston is also provided with grooves 398 and 399. The servo regulator timer valve has ports 402, 403, 404, 405 and 406.

The governor modulator valve 114 includes a bore 411 in the case assembly 150 and has a piston 412 slidable within the bore. The piston 412 is provided with lands 413 and 414 separated by a groove 415. The governor modulator valve 114 has a spring 416 urging the piston down as viewed in FIGURE 3D. The governor modulator valve 114 is also provided with ports 417, 418, 419 and 420.

The pump 118 is connected to the ports 183 and 186 of the primary regulator valve 101 through conduit 121. An orifice 122 is included in conduit 121 near port 186. Conduit 121 is also connected to the manual selector valve 100 through port 166, to the throttle valve 103 through port 233, to the downshift valve 104 through port 229, to the compensator valve 105 through port 253, to the servo regulator timer valve 113 through port 405 and to the 1–2 shift valve 109 through port 311 and constitutes the main pressure supply conduit for the controls of the transmission.

Conduit 125 is connected to ports 203 and 207 of the secondary regulator valve 102 and to the primary regulator valve through port 184. An orifice 123 is included in conduit 125 adjacent port 207. Conduit 125 is also connected to supply fluid to torque converter 15. Conduit 126 connects port 201 of the secondary regulator valve 102 to the sump 120.

Conduit 127 is connected to the compensator modulator valve through port 279, to the secondary regulator valve through port 199, and to the primary regulator valve 101 through port 182 and is also connected to the safety valve 117.

Conduit 128 is connected to the secondary regulator valve through port 202 and constitutes the lubrication supply conduit for the transmission.

Conduit 130 is connected to the secondary regulator valve through port 205 and to the torque converter 15 and is the converter return pressure conduit. Conduit 131 is connected to the secondary regulator valve through port 206 and is connected to the transmission oil cooler which is not illustrated.

Conduit 132 connects ports 160 and 162 of the manual selector valve 100. Conduit 132 is also connected to 1–2 shift valve 109 through port 310 and to a directional ball check valve 135.

Conduit 133 is connected to ports 163 and 165 of the manual selector valve 100 and is also connected to the 2–3 shift valve 110 through port 350 and to the front clutch servomotor 33 and the governor valve 108.

Conduit 136 is connected to the selector valve 100 through ports 167 and 168, to the downshift valve 104 314, to the 2–3 shift valve through port 353, and to a directional check valve 134.

Conduit 137 is connected to the selector valve 100 through port 169 and to the 2–3 shift valve through port 352. An orifice 137a is provided in conduit 137 adjacent port 352. Ports 161 and 170 of the selector valve 100 are exhaust ports.

Conduit 138 is connected to the downshift valve 104 through port 228, to the 1–2 shift valve through port 319 and to the 2–3 shift valve 110 through ports 346 and 348.

Conduit 139 is connected to the throttle valve 103 through ports 232 and 234; to the compensator valve 105 through ports 248; to the compensator cutback valve 106 through port 267; to directional check valve 134 and to the 2–3 shift valve 110 through port 344. Ports 230 and 231 of the throttle valve 103 are exhaust ports.

Conduit 140 is connected to the directional valve 134 and to orifice control valve 111 through port 370.

Conduit 141 is connected to the compensator valve 105 through ports 252 and 254 and to the compensator modulator valve 107 through port 280.

Conduit 142 is connected to the compensator valve 105 through port 249; the compensator cutback valve 106 through port 268, and the compensator modulator valve 107 through port 281. Ports 250 and 251 of the compensator valve 105 are exhaust ports.

Conduit 143 is connected to the compensator cutback valve 106 through port 270; to the governor valve 108, to the servo regulator valve 112 through port 380, to the governor modulator valve 114 through port 419, to the 2–3 shift valve 110 through port 354 and to the directional check valve 135. Ports 266 and 269 of the compensator cutback valve are exhaust ports. Ports 277 and 278 of the compensator modulator valve 107 are exhaust ports.

Conduit 144 is connected to the governor modulator valve 114 through ports 418 and 420 and to the servo regulator valve 120 through port 379. Ports 417 of the governor modulator valve 114 is an exhaust port.

Conduit 145 is connected to the regulator timer valve 113 through ports 404 and 406 to the front servo apply regulator valve 112 through ports 384 and to the orifice control valve 111 through port 367.

Conduit 145a is connected to the servo regulator valve 112 through port 385 and to fluid passage 54 of the servomotor 42 as shown in FIGURE 4.

Conduit 146 is connected to the servo regulator timer valve 113 through port 402, to the orifice control valve 111 through port 369, to a ball type valve 147, to the rear clutch servomotor 37, and to the 2–3 shift valve through port 351. Port 403 of the servo regulator timer valve 113 is an exhaust port.

Conduit 148 is connected to the servo regulator valve 112 through port 382 and fluid passage 56 of servomotor 42. A check valve 148a is included in conduit 148. A relatively restricted passage 148b is provided which bypasses check valve 148a. Port 383 of the servo regulator valve 112 is an exhaust port.

Conduit 149 is connected to the orifice control valve 111 through port 368, to the ball relief valve 147, and to fluid passage 55 of the servomotor 42. A restriction 450 is provided which interconnects the conduits 146 and 149.

Conduit 451 is connected to the rear servomotor 62 and is connected to ports 309 and 315 of the 1–2 shift valve 109. Conduit 452 is connected to the servo regulator valve 112, through port 381 and to the 1–2 shift valve 109 through port 312. Conduit 453 is connected to the 1–2 shift valve through port 320 and to the directional check valve 135. Ports 313, and 316 of the 1–2 shift valve 109 are exhaust ports.

Conduit 454 interconnects ports 345 and 347 of the 2–3 shift valve and is also connected to the 1–2 shift valve through port 318. Port 349 of the 2–3 shift valve 110 is an exhaust port.

*Operation of the pressure regulation system*

With the selector lever in neutral position and the engine running the pump 118 supplies pressure to conduit 121 which connects to the throttle valve 103, the downshift valve 104, the compensator valve 105, the front servo apply regulator timer valve 113 and the 1–2 shift valve 109.

Cam 224 operated by the throttle pedal 226 will urge the downshift valve piston 219 down compressing spring 223 and thereby urging the throttle valve piston 212 down as the throttle is depressed. When the throttle valve piston 212 moves down a porion of the line pressure in condui 121 will flow from port 233 through groove 216 and port 232 into conduit 139. The pressure in conduit 139 is termed "throttle pressure" and will vary in direct proportion with the amount of depression of the throttle pedal 226.

The pressure in conduit 139 is conducted to the groove 217 on piston 212 through port 234 and acts on the differential area between lands 214 and 215 tending to move the piston 212 up thereby producing a regulated pressure in conduit 139 which will be less than line pressure in conduit 121. Throttle pressure in conduit 139 is imposed on the lower end of the spring biased plug 243 of the compensator valve 105 through port 248.

The governor valve 108 is of a conventional construction and is responsive to the speed of the driven shaft 12 to supply pressure in conduit 143 which will increase with increasing speed of the driven shaft.

The compensator cutback valve 106 has governor pressure in line 143 imposed on the upper side of land 264 through port 270. Governor pressure acting on the land 264 will move the compensator cutback valve to down as viewed in FIGURE 2 in accordance with the value of the governor pressure and allow throttle pressure in conduit 139 to flow from port 267 through groove 265 and port 268 into conduit 142. Throttle pressure in groove 265 will act on the differential areas between lands 263 and 264 to tend to move the valve piston 262 up and thereby produce a regulated pressure in conduit 142 which is equal to or less than throttle pressure. The regulated throttle pressure in conduit 142 is imposed on the upper side of the land 243 of the piston 242 of the compensator valve 105 and on the lower side of land 274 of the compensator modulator valve 107.

Assuming the vehicle is not yet moving and the governor pressure in conduit 143 is zero the only forces acting on the compensator valve 105 will be the spring 247 and throttle pressure in conduit 139 impressed on the plug 243 moving the compensator valve up and allowing line pressure to flow from conduit 121 through port 253, groove 246, and port 252 and into conduit 141. The pressure in conduit 141 is termed "compensator pressure." The value of the pressure in conduit 141 will depend upon the value of the throttle pressure in conduit 139. When the vehicle begins to move and governor pressure is imposed on the lands 264 of the compensator cutback valve the compensator pressure in conduit 141 (due to increasing pressure in conduit 142 acting on the upper side of plug 243) will decrease with increasing governor pressure and increase with increasing throttle pressure.

The compensator pressure in conduit 141 is conducted through port 280 of the compensator modulator valve 107, groove 275, port 279, conduit 127, port 199 of the secondary regulator valve 102, port 182 of the primary regulator valve 101. Modulated compensator pressure in conduit 127 thereby acts on the upper side of land 173 of the primary regulator valve 101 and the upper side of land 193 of the secondary regulator valve 102.

The compensator modulator valve 107 is mainly a pressure limiting valve which will allow the compensator pressure in conduit 127 to reach a predetermined maximum before the pressure acting on the differential area between the lands 273 and 274 of the valve piston 272 will move the piston 272 up and open the compensator pressure conduit 127 to the sump through exhaust port 278.

Line pressure in conduit 121 as supplied by the pump 118 is regulated by the primary regulator valve 101. Spring 181 holds the primary regulator valve piston 172 down initially and as the pump 118 begins to work, line pressure will be supplied through port 186 to groove 179 where the pressure acts on the differential area between lands 174 and 175 to urge the valve piston 172 up and thereby bypass some of the line pressure into conduit 125 from port 183 through groove 178 and port 184.

The value of the pressure in line pressure conduit 121 will vary in direct proportion to the value of the compensator pressure in conduit 127 which is imposed on the land 173 of the primary regulator valve piston 172 tending to move the piston down and acting against the force produced by line pressure acting on the differential area between lands 174 and 175. If the compensator pressure in conduit 127 is at a maximum, the primary regulator valve will be down restricting fluid from being bypassed through port 184 to the conduit 125 and thereby producing a maximum line pressure in conduit 121. As the compensator pressure in conduit 127 decreases, the primary regulator valve piston 172 will move up due to the force developed by the differential area between lands 174 and 175 and thereby allow a greater portion of the line pressure to be bypassed through port 184 into conduit 125.

The secondary regulator valve 102 regulates the pressure in the torque converter 15 in a like manner by allowing a portion of the converter return pressure in conduit 130 to be bypassed to the cooler through port 206 and conduit 131. Spring 198 initially holds piston 192 down. Pressure in conduit 125 is also imposed through orifice 123 on the lower side of land 195 tending to move piston 192 up. If the compensator pressure in conduit 127 is at a maximum the compensator pressure acting on the upper side of land 193 will move the piston 192 down against the force created by pressure on the lower side of land 195 whereby land 194 tends to block the port 205 connected to the converter return conduit 130 and will thereby maintain the torque converter fluid pressure at a maximum value. As the compensator in the conduit 127 decreases pressure imposed on land 195 of the piston 192 will move the piston up allowing increasing amounts of the converter return pressure in conduit 130 to flow through port 205, groove 196, port 206 and conduit 131 to the cooler and thereby reduce the converter pressure. As the piston 192 moves up some of the fluid pressure will pass through port 202 from port 203 into the lube line 128. When the pressure in conduit 125 exceeds some predetermined value the piston 192 will move up enough to allow pressure to flow from conduit 125 port 203 into port 201 and conduit 126 to return to the sump. Therefore, the value of the line pressure in conduit 122 and the pressure in the torque converter 15 will increase as the compensator pressure in conduit 127 increases and decrease as the compensator pressure decreases providing a direct relation between the value of line pressure and the compensator pressure.

*Operation of the hydraulic transmission ratio control system*

The manual selector valve 100 has P R N, D–1, D–2 and L positions corresponding to Park, Reverse, Neutral, Drive 2, Drive 1 and Low positions. When the selector valve is in the L or low position, manual low or first speed ratio will be established with the brake 20 holding carrier 31 and clutch 17 engaged. In the D–1 position, first, second and third ratios will be automatically established as the car accelerates from a stop to highway speed. In the D–2 position the transmission starting ratio will be second speed with a subsequent upshift to third speed and first speed is unavailable in the D–2 position.

When the manual selector valve is moved to the D–1 position fluid pressure in conduit 121 is admitted from port 166 through groove 158 and ports 163 and 165 to conduit 133. Conduit 133 conducts fluid pressure to the governor valve 108 and to the servomotor 33 for the front clutch 17 thereby engaging the front clutch. Fluid pressure in conduit 133 is also connected through port 350 of 2–3 shift valve 110 and into groove 340 of the 2–3 shift valve. The 2–3 shift valve is at this time in its upper position as illustrated in FIGURE 2 since there will be minimum governor pressure in conduit 143 imposed on the upper side of land 338 of the 2–3 shift valve at this time.

Since the front clutch 17 is engaged with the engine driving, the one-way brake 21 will be engaged and hold the carrier 31 against rotation and thereby first speed drive ratio is established through the transmission.

Line pressure in conduit 121 is conducted through port 405 of the servo regulator timer valve 113 and acts on the differential area between the lands 394 and 395 to move the servo regulator timer valve down as viewed in FIGURE 2. With the valve 113 moved down, line pressure will be admitted to conduit 145 from conduit 121 and thereby through port 384 to the lower end of the servo regulator valve 112 and through port 367 to the upper end of the orifice control valve 111. Since governor pressure is non-existent or at a minimum when starting, the governor modulator valve will be in the position illustrated at this time and no governor pressure admitted to conduit 144. Therefore, the piston 372 of the servo regulator valve 112 will be in the up position due to the force of line pressure acting on the lower side of land 375.

As the vehicle speed increases and thereby governor pressure exists in conduit 143 a point will be reached, depending upon the value of the throttle pressure admitted through port 318 into groove 306 of the 1-2 shift valve 109 and acting on the differential area between lands 301 and 302, at which the governor pressure acting on land 303 will overcome the force of spring 308 and the throttle pressure to move the piston 298 of the 1-2 shift valve to the down or "upshifted" position. When the shift valve 109 is moved to the down position line pressure in conduit 121 will flow through port 311, groove 297, port 312, conduit 452, port 381 of the front servo apply regulator timer valve 112, groove 377 and port 382 into conduict 148, fluid passage 56 and apply chamber 42a to actuate the front servomotor 42 to engage brake 19 and establish second speed drive ratio. Check valve 148a opens at this time to allow rapid fill of apply chamber 42a.

The value of the modulated governor pressure in conduit 144 will be a regulated pressure equal to or less than governor pressure since in the governor modulator valve 114 governor pressure flows from port 419 through groove 415 into port 418 and into conduit 144. The spring 416 will urge the valve piston 412 tending to open the port 419 and the force of the governor pressure flowing through groove 415 and acting on the differential area between lands 413 and 414 will tend to move the valve up blocking port 419. Thus the pressure in conduit 144 will be a modulated governor pressure and equal to or less than governor pressure in conduit 143.

Governor pressure in conduit 143 is admitted through port 354 to the upper end of the 2-3 shift valve 110 and acts on land 338 urging the valve piston 333 down to the "upshifted" position. Movement of the piston 333 of the 2-3 shift valve to its "upshifted" position is opposed by the force of throttle pressure in conduit 139 acting on the lower end of land 32, by the force of spring 343, and by the value of the shift valve plug pressure acting on the lower side of land 334.

Shift valve plug pressure is produced by the throttle pressure in conduit 139 urging the shift valve plug 332 up against the force of spring 343 and admitting a portion of this pressure through port 345 into conduit 454. The pressure in conduit 454 is thereby termed shift valve plug pressure and is a regulated pressure less than the value of throttle pressure.

As the governor pressure in conduit 143 increases as the vehicle speed begins to increase a point is reached at which governor pressure acting on the upper side of land 338 will move the piston 333 of the 2-3 shift valve against the above-mentioned forces to the "upshifted" position. When the 2-3 shift valve moves to the "upshifted" position line pressure in conduit 133 will be admitted through port 350, groove 341 and port 351 into conduit 146. Line pressure in conduit 146 will engage rear clutch 18 and will flow through the ball check valve 147 and restriction 450 into conduit 149 to fluid passage 55 of servomotor 42 to release chamber 42b of the servomotor 42 to release front brake 19 to establish third speed or high speed drive ratio with front clutch 17 and rear clutch 18 engaged.

After the 2-3 shift is completed, line pressure in conduit 146 admitted through port 402 of servo regulator timer valve 113 will act on land 393 to move the valve piston 392 up as viewed in FIGURE 2. When the valve piston is moved up line pressure previously admitted to conduit 145 will be blocked by land 394. Therefore, no line pressure is admitted through port 384 of the servo regulator valve 112 to hold the valve 112 in its up position thereby enabling the servo regulator valve 112 to subsequently regulate pressure in conduit 148 in dependence upon the governor pressure acting on lands 373 and 374 opposed by spring 378, when the 2-3 shift valve piston 333 moves to the "upshifted" position.

At the time of the 2-3 upshift the fluid pressure being admitted into conduit 149 to the servo release chamber 42b will flow through check valve 147 bypassing restriction 450.

Figure 5:
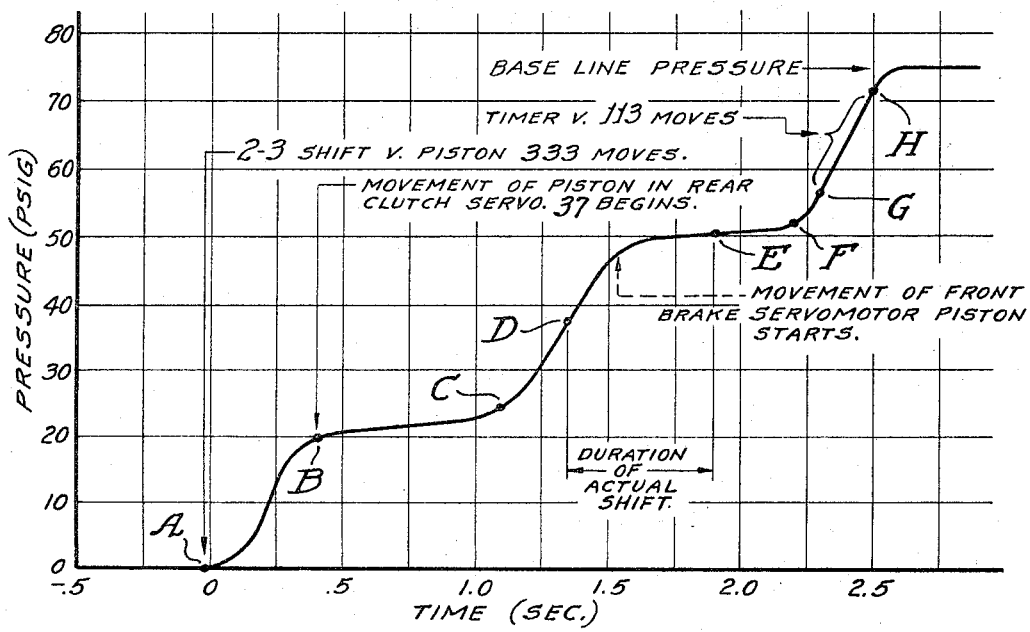
FIGURE 5 is a graph illustrating the pressure change in the rear brake apply servomotor 62 during the 2–3 shift.

As explained above, the function of the servo regulator timer valve 145 is to trigger operation of the servo regulator valve 112 and allow the servo regulator valve 112 to regulate fluid pressure in the front servo apply pressure conduit 148 during the 3-2 downshift. Referring to FIGURE 5, a curve plotting time in seconds versus fluid pressure in conduit 146 or servomotor 37 more clearly illustrates the operation of the servo regulator timer valve in relation to the other valves of the transmission. When the 2-3 shift valve piston 333 moves to the third speed position as indicated at point A on the graph, pressure begins building up in conduit 146. At about .5 second the movement of the piston in the rear clutch servomotor 37 begins as indicated at point B. At point C on the curve the piston has moved to a point where the friction surfaces of the clutch discs are contacted at about 1.2 seconds. The pressure then increases again and the actual shift or engagement of the rear clutch starts at about 1.3 seconds as indicated at point D on the curve and is completed at 1.8 seconds indicated at point E. At approximately 2.2 seconds indicated as point F the pressure begins increasing again at 2.3 seconds indicated as point G the piston 392 of the servo regulator timer valve begins moving up due to the fluid pressure in conduit 146 admitted through port 402. At 2.5 seconds indicated as point H the servo regulator timer valve piston has moved to its "up" position thereby interrupting the flow of pressure into conduit 145, thus releasing piston 372 of the servo regulator valve and conditioning the servo regulator valve for regulating fluid pressure during the 3-2 downshift in the conduit 148 which engages the front brake 19 to establish the second speed. Thus it will be apparent that the timer valve 113 conditions the servo regulator valve 112 for pressure regulation only after the 2-3 shift is completed and once the shift is completed the servo regulator valve is then ready to perform its function in providing an improved and smoother 3-2 downshift. The curve in FIGURE 5 illustrates readings taken during test at a particular throttle setting and vehicle speed. At different vehicle speeds or throttle settings due to the operation of the pressure regulating valve 101 the position of the curve will shift although the shape will remain the same.

During the 2-3 shift, before the pressure builds up in conduit 146 to a point to move piston 392 of valve 113 to its up position, fluid pressure exists in conduit 145. Fluid pressure in conduit 145 will flow from port 384 of the servo regulator valve 112 to port 385 and conduit 145a. Fluid pressure in conduit 145a is commutated through fluid passage 54 of servomotor 42 to secondary release chamber 51 of the servomotor 42. Thus, during the 2-3 shift, pressure will exist in both chamber 42b and 51 of servomotor 42 to rapidly move pistons 43 and 49 of the servomotor to the release position to ensure disengagement of the brake 19. As previously described when the fluid pressure builds up in conduit 146 valve piston 392 of valve 113 will be moved to its up position thereby draining conduit 145 and therefore secondary release chamber 51 through ports 404 and 403 of servo regulator timer valve 113. A 3-2 downshift will take place in the transmission when the vehicle speed drops below a predetermined value where the value of the throttle pressure and the other forces urging the valve piston 333 of the 2-3 shift valve 110 to its up or "downshifted" position are sufficient to overcome governor pressure acting on land 338 and thereby establish a second speed. When the valve piston 333 moves to the "downshifted" position, line pressure in conduit 146 which has engaged the rear clutch and held the servomotor 42 in its released position will flow through conduit 146, port 351 of the 2-3 shift valve, port 352, conduit 137 and through port 170 of the selector valve 100 to exhaust.

The speed at which fluid will be exhausted from the release chamber 42b of the servomotor 42 through conduit 149 will depend upon the position of the valve piston 362 of the orifice control valve 111. If throttle pressure is at a high value as would happen in a forced throttle downshift, the orifice control valve piston 362 will be in the up position and the restriction 450 will be bypassed and the release chamber will be drained rapidly providing a rapid engagement of the front brake 19 to establish second speed.

If the downshift occurs with a small value of throttle pressure as when coasting to a stop, the valve piston 362 will be in the down position with land 363 blocking the bypass through ports 368 and 369 around restriction 450 and the fluid from the release chamber 42b of the servomotor 42 for the front brake 19 will drain through restriction 450 and thereby be delayed producing a more gradual engagement of the front servo-motor to provide a smooth downshift. A subsequent upshift to third speed may occur as described previously. When the 3-2 shift is initiated by movement of the 2-3 shift valve piston 333 to its "downshifted" position piston 392 of valve 113 will be in the up position and therefore no line pressure exists in conduit 145. Therefore initially the servo regulator valve 112 is free to regulate the servo applied pressure in conduit 148 to some value less than full-line pressure in conduit 452 in dependence upon the value of governor pressure at ports 380 and modified governor pressure at port 379 of the servo regulator valve. Thus at higher vehicle speeds the 3-2 shift will be further delayed by the pressure in conduit 148 being regulated to a pressure much less than full-line pressure. When servomotor 37 is exhausted, valve 113 moves down and supplies line pressure to valve 112 through conduits 121, 145, and port 384 and stops valve 112 from regulating.

After second speed is established a 2-1 downshift can take place at a point in dependence upon the governor pressure imposed on the upper side of land 303 of the valve piston 298 of the 1-2 shift valve, as opposed by the force of the spring 308. When the valve piston 298 moves to the up or "downshifted" position line pressure from conduit 121 is cut off at port 311 by land 294 and the pressure in conduit 452 flowing to the servo regulator valve 112 and conduit 148 is drained through port 312, groove 297, and port 313 of the 1-2 shift valve to the sump. Thereby the servo apply pressure in conduit 148 is drained and first speed will be established since clutch 17 remains engaged and the one-way brake 21 now engages carrier 31 to establish first speed drive ratio.

When the selector valve 100 is moved to the D-2 position line pressure in conduit 121 flows through port 166 through groove 158 into ports 163 and 165 and thereby into conduit 133 and also through port 162 into conduit 132. Line pressure in conduit 132 flows through port 310 to groove 296 of piston 292 of the 1-2 shift valve. Line pressure in groove 296 acts on the large differential area between lands 293 and 294 to hold the valve piston 292 in its down or "upshifted" position thereby opening line pressure conduit 121 to conduit 452 as previously described to apply the front brake and thereby establish second speed ratio. Line pressure in conduit 132 is also effective to move the ball of the directional valve 135 to the right admitting line pressure to conduit 453 and interrupting the flow of governor pressure in conduit 143 to conduit 453. Line pressure in conduit 453 is admitted through port 320 to the upper side of land 303 of the 1-2 shift valve therefore imposing an additional force on the piston 298 thereby assuring it will be held in the "upshifted" position.

Therefore, in the D-2 position first ratio is not established and the vehicle will start in second speed ratio since the 1-2 shift valve is locked in its second speed or upshifted position by line pressure in conduit 132. A subsequent upshift to third speed drive ratio and the 3-2 downshift occur in the same manner as described above.

When the manual selector lever 100 is put in the L position line pressure in conduit 121 flows through port 166, groove 158, port 167 into conduit 136 and through port 165 into conduit 133. As previously described, line pressure in conduit 133 feeds pressure to the governor valve 108 and engages the front clutch 17. Line pressure in conduit 136 is admitted through port 353 to the 2-3 shift valve 110 and through port 314 to 1-2 shift valve 109. Line pressure in port 353 will act on the differential area between lands 337 and 338 of the 2-3 shift valve to urge the 2-3 shift valve to its "downshifted" position or second speed position. In any throttle position other than "kickdown" line pressure in conduit 136 will also flow through port 227, groove 222, and port 228 of downshift valve 104 into conduit 138. Line pressure in conduit 138 will enter at ports 348 and 346 of the 3-2 shift valve and act on the differential area between lands 334 and 335 to help urge piston 333 to the "downshifted" position. Line pressure in conduit 138 will also enter 1-2 shift valve 108 at port 319 to act on the differential area between lands 303 and 302 of 1-2 shift valve to help move piston 298 to the "downshifted" position.

After piston 333 of the 2-3 shift valve has moved to its second speed position, line pressure flowing through port 354 will act on the differential area between lands 337 and 338 and between lands 334 to lock the valve in its "downshifted" position. Line pressure at port 314 of 1-2 shift valve 109 will be admitted through groove 304 on the 1-2 shift valve piston 298 and act on the differential area between lands 299 and 300 to also urge the valve piston 298 to its "downshifted" position. If the valve piston 298 is initialy in its "upshifted" position, the shift to the "downshifted" position is inhibited since if the vehicle speed is too high to allow a shift to first ratio governor pressure will be of a great enough value acting on land 303 to delay the shift to first ratio until the vehicle speed is sufficiently low to thereby avoid engine overspeed when the shift occurs and prevent a rough shift.

When the valve piston 298 is in its "downshifted" position fluid pressure in conduit 136 will flow through port 314, groove 304, and port 315 to fluid conduit 451. Line pressure in conduit 451 is admitted through port 309 of the 1-2 shift valve to act on land 293 to lock piston 298 in the "downshifted" position. Line pressure in conduit 451 is admitted to servomotor 62 to apply the rear brake 60 to positively establish first speed drive ratio. Thus when first speed drive ratio is manually established the transmission will remain in first speed ratio until the selector lever is moved from the "L" position. With the manual selector valve in the "L" position and line pressure thereby in conduit 136 the ball of the directional valve 134 will be moved to the right admitting line pressure to conduit 140. Throttle pressure in conduit 139 is therefore blocked from entering conduit 140. Line pressure in conduit 140 will move piston 362 of the orifice control valve to its up position thereby interconnecting ports 368 and 369 to open the bypass around restriction 450 between conduits 149 and 146.

When the manual selector valve 100 is moved to the reverse position line pressure in conduit 121 will flow through port 166, groove 159, into ports 167 and 168 to conduit 136, and through port 169 into conduit 137. Line pressure in conduit 136 will also be communicated as in the "L" position of selector valve 100 through downshift valve 104 into conduit 138 to urge both shift valves to the "downshifted" positions as described above. As above described, line pressure in conduit 136 will lock the 1–2 shift valve 109 and the 2–3 shift valve 110 in their "downshifted" positions and will also apply the rear brake 60. Line pressure in conduit 137 will flow through port 352 of the 2–3 shift valve 110, through groove 341, port 351 into conduit 146 and thereby into the rear clutch servomotor 62 to engage the rear clutch 18 and also to the release chamber of the servomotor 42 for the front brake 19 thus engaging the rear clutch and releasing the front brake.

Line pressure in conduit 146 will also act on land 393 of the servo regulator timer valve 113 to hold the valve up and thereby prevent line pressure in conduit 121 from entering conduit 145.

When operating in third or high speed drive ratio accelerator kick-down shift to second speed is available or, if in second speed, an accelerator kick-down shift to first speed is available in the transmission. When operating in third speed if the throttle pedal is depressed all the way to full open, the throttle cam 224 will urge the downshift valve 104 down to the extent that line pressure in conduit 121 can flow from port 229 through groove 222 into port 228 and conduit 138. Line pressure in conduit 138 will flow through ports 346 and 348 of the 2–3 shift valve and will act on the differential area between lands 334 and 335 and the lower side of land 334 to force the 2–3 shift valve to the "downshifted" position. If high vehicle speeds are involved the governor pressure in conduit 143 imposed on the land 338 of the 2–3 shift valve piston 333 may be great enough to maintain the transmission in third speed even though the kick-down of the throttle pedal was made. When the 2–3 shift valve moves to the "downshifted" position second speed ratio will be established in a manner previously discussed and the 2–3 shift valve will be held in the "downshifted" position by the kickdown pressure at ports 346 and 348. Also at this time the spring 223 will be compressed to an extent to force the throttle valve piston 212 down against the force of blade spring 218 and the throttle pressure in conduit 139 will be line pressure, and throttle pressure in conduit 139 which is imposed on shift valve plug 332 of the 2–3 shift valve through port 344 will assist the kick-down pressure in moving the 2–3 shift valve to the "downshifted" position or second speed position.

If the vehicle is operating in second speed ratio the kick-down operation will be available to downshift the transmission to first speed ratio. The 1–2 shift valve 109 will be urged to its "downshifted" position as viewed in FIGURE 3B by kickdown or line pressure flowing through port 319 from conduit 138 into groove 307 and acting on the differential area between lands 302 and 303. Also line pressure at port 346 of the 2–3 shift valve will flow through port 347 into conduit 454. Once the valve has moved to the "downshifted" position by overcoming the force of the governor pressure in conduit 453 imposed on land 303 the piston will be held in the downshifted position since line pressure in conduit 454 is admitted through port 318 to impose an additional force acting on the differential area between lands 301 and 302. This pressure is admitted through port 318 and into groove 306 and will act on the differential area between lands 301 and 302 to inhibit movement of the 1–2 shift valve into second speed position during the full throttle depression. As long as the kickdown operation continues the throttle pressure in 139 is at a high value.

From the above it will be apparent that the present invention provides a fully automatic transmission establishing first, second and third speed drive ratios in which an advantageous and improved control system is employed wherein once the third speed ratio is established the servo regulator timer valve 113 will operate to render the servo regulator valve 112 effective to regulate the line pressure in conduit 452 utilized to establish second speed ratio on a 3–2 shift to produce a smooth downshift.

Further, due to the operation of the orifice control valve 111 on zero or light throttle 3–2 shifts the front servo release chamber is drained slowly since the fluid must pass through restriction 450 thereby creating a delay and aiding in producing a smooth 3–2 shift. Further with any significant throttle pressure, the fluid may bypass the restriction 450 through the orifice control valve 111 to produce a rapid ratio shift as desired with heavy throttle pressure.

Another important and advantageous feature of the invention is that when operating in low and reverse speed ratios the downshift valve connects line pressure in conduit 136 to the downshift or kickdown line 138. Thus, without the addition of extra conduits or lands on the shift valve and by using the kickdown pressure line 138 when operating in low and reverse sufficient fluid pressure force is developed on the shift valves to hold them in their "downshifted" positions without the necessity of adding additional conduits to accomplish this purpose.

Further, the present invention provides a means of regulating the transmission line pressure wherein the line pressure varies directly with the value of the compensator pressure which in turn increases with increasing throttle pressure.

Thus it will be seen that the transmission of the present invention provides smoother upshifts and downshifts by incorporating valves to regulate the fluid pressure to a servomotor to produce smooth engagement of the friction elements and to provide rapid engagement when desired as in heavy or full throttle operation.

It is to be understood that the invention is not to be limited to the specific constructions and arrangements shown and described except only insofar as the claims may be so limited as it will be understood to those skilled in the art that changes may be made without departing from the principles of the invention.

I claim:

1. In a hydraulic control system for an automatic transmission adapted to be used in an automotive vehicle having a driving engine, a drive shaft, a driven shaft, a source of fluid pressure for supplying pressure to the control system, a first fluid pressure operated means for establishing a low speed drive ratio between said shafts, a second fluid pressure operated means for establishing a high speed drive ratio between said shafts, a shift valve connected to said source of pressure and said first and second fluid pressure operated means and operable to establish either of said drive ratios, a valve responsive to the speed of the driven shaft connected to said source and operable to supply a pressure which varies with the speed of the driven shaft, a first valve connected between said source of fluid pressure and said fluid pressure operated means, said first valve being operative to control the pressure of the fluid communicated to said first fluid pressure operated means, a second valve connected to said pressure varying with the speed of the driven shaft and operable to supply said speed responsive pressure to said first valve, said speed responsive pressure acting on said first valve whereby said first valve will regulate the pressure of the fluid supplied to said first fluid pressure operated means when said shift valve moves to establish said low speed drive ratio so as to provide a smooth downshift.

2. A transmission as claimed in claim 1 wherein a third valve is connected to said source of pressure and said first valve and is operable to supply line pressure to said first valve until said high speed ratio is established to prevent said first valve from regulating the pressure supplied to said first fluid pressure operated means.

3. A transmission as claimed in claim 2 wherein said third valve is connected to said second fluid pressure operated means whereby after said high speed drive ratio is established said third valve will be moved to a position to cut off the supply of pressure to said first valve from said third valve and thereby allow said first valve to regulate the pressure to be supplied to said first fluid pressure operated means in response to vehicle speed and thereby provide a smooth downshift.

4. A transmission as claimed in claim 3 wherein the pressure supplied to said first fluid pressure operated means from said first valve will be decreased as the vehicle speed responsive pressure increases.

5. In a tranmission mechanism for an automotive vehicle having an engine and a throttle and throttle actuator for controlling the engine, a drive shaft, a driven shaft, means including a first fluid pressure actuated servomotor for completing a low speed power train between said shafts, means including a second pressure actuated servomotor for completing a high speed power train between said shafts, a source of fluid pressure, a shift valve connected to said source and operable to direct fluid from said source to said servomotors for completing the power trains, said shift valve having a downshifted position in which said low speed power train is completed and upshifted position in which said high speed power train is completed, a governor valve connected to said driven shaft and to said source and adapted to supply a governor fluid pressure that varies with driven shaft speed, a first valve connected between said source of pressure and said servomotor for said low speed power train, said first valve being connected to said governor fluid pressure, said first valve being operable to regulate the fluid pressure being supplied to said low speed power train servomotor in accordance with the speed of the driven shaft to provide for a smooth shift from said high speed drive train to said low speed drive train.

References Cited

UNITED STATES PATENTS

| | | | |
|---|---|---|---|
| 3,004,446 | 10/1961 | Flinn | 74—472 |
| 3,023,632 | 3/1962 | Flinn | 74—472 |
| 3,165,946 | 1/1965 | Wayman | 74—645 |
| 3,167,970 | 2/1965 | Wagner et al. | 74—472 |
| 3,248,964 | 5/1966 | Ivey | 74—472 |
| 3,258,984 | 7/1966 | Searles | 74—472 |

DONLEY J. STOCKING, *Primary Examiner.*

L. H. GERIN, *Assistant Examiner.*